United States Patent
Palmlöf et al.

(10) Patent No.: US 9,534,711 B2
(45) Date of Patent: Jan. 3, 2017

(54) SINGLE SITE POLYMER

(75) Inventors: Magnus Palmlöf, Västra Frölunda (SE);
Espen Ommundsen, Langesund (NO);
Anne Britt Bjåland, Porsgrunn (NO);
Alexander Krajete, Linz (AT)

(73) Assignee: Borealis AG, Vienna (AT)

( * ) Notice: Subject to any disclaimer, the term of this patent is extended or adjusted under 35 U.S.C. 154(b) by 674 days.

(21) Appl. No.: 13/881,468

(22) PCT Filed: Oct. 26, 2011

(86) PCT No.: PCT/EP2011/068796
§ 371 (c)(1),
(2), (4) Date: Jul. 9, 2013

(87) PCT Pub. No.: WO2012/055932
PCT Pub. Date: May 3, 2012

(65) Prior Publication Data
US 2013/0287983 A1   Oct. 31, 2013

(30) Foreign Application Priority Data

Oct. 28, 2010 (EP) .................................. 10189292

(51) Int. Cl.
| | |
|---|---|
| *F16L 9/12* | (2006.01) |
| *C08L 23/08* | (2006.01) |
| *C08L 23/06* | (2006.01) |
| *C08F 10/02* | (2006.01) |
| *F16L 9/127* | (2006.01) |
| *B29C 47/00* | (2006.01) |
| *C08F 10/00* | (2006.01) |
| *C08L 23/04* | (2006.01) |
| *C08F 4/659* | (2006.01) |
| *C08F 110/02* | (2006.01) |

(52) U.S. Cl.
CPC .............. *F16L 9/12* (2013.01); *B29C 47/0004* (2013.01); *B29C 47/0023* (2013.01); *C08F 10/00* (2013.01); *C08F 10/02* (2013.01); *C08L 23/04* (2013.01); *C08L 23/06* (2013.01); *C08L 23/08* (2013.01); *F16L 9/127* (2013.01); *C08F 4/65912* (2013.01); *C08F 110/02* (2013.01); *Y10T 428/139* (2015.01); *Y10T 428/1393* (2015.01)

(58) Field of Classification Search
CPC ........... C08L 23/04; C08L 23/06; C08L 23/08; C08F 10/00; C08F 10/02; F16L 9/12; F16L 9/127; Y10T 428/139; Y10T 428/1393; B29C 47/0004; B29C 47/0023
See application file for complete search history.

(56) References Cited

U.S. PATENT DOCUMENTS

| | | | | |
|---|---|---|---|---|
| 4,576,993 A | * | 3/1986 | Tamplin | ................ B01D 71/26 525/240 |
| 5,446,221 A | | 8/1995 | Struglinski | |
| 5,844,009 A | * | 12/1998 | Hurley | ................... C08J 9/0061 521/110 |
| 2003/0130445 A1 | | 7/2003 | Van Baar et al. | |

FOREIGN PATENT DOCUMENTS

| | | |
|---|---|---|
| JP | 3 099823 A | 4/1991 |
| WO | 2010/049170 A1 | 5/2010 |

* cited by examiner

*Primary Examiner* — Walter B Aughenbaugh
(74) *Attorney, Agent, or Firm* — Sutherland, Asbill & Brennan LLP (57) ABSTRACT

A single site catalysed ethylene polymer including ethylene and optionally at least one comonomer having a Mw/Mn of less than 5 and wherein the total amount of unsaturations of the ethylene polymer is at least 0.8.

18 Claims, 1 Drawing Sheet

SINGLE SITE POLYMER

TECHNICAL FIELD

This invention relates to a single site polyethylene polymer having high levels of unsaturation as well as to a process for the manufacture of that polymer and the use of that polymer in the preparation of cross-linked articles such as pipes.

BACKGROUND OF THE INVENTION

An advantageous base material for polyethylene cross-linked pipes (PEX pipe) is a narrow molecular weight distribution (nMWD) polyethylene with high crosslinking potential and low content of odour active components. High reactivity towards crosslinking can be achieved by ensuring a high degree of unsaturation in the polymer.

It is known that nMWD can be achieved by Single Site Catalyst (SSC) technology but normally these polymers have a relatively low crosslinking potential compared to for example, chromium catalyst produced polyethylene (Cr-PE). Cr-PE contains a large number of unsaturations making it readily cross-linkable.

In single site catalysis however, it is normal to control molecular weight using hydrogen and this makes a significant difference to the structure of the polymer. When a propagating PE molecule is terminated by hydrogen, the polyethylene molecule is saturated at the terminus and hence there are low levels of unsaturation in the formed polymer. It is therefore difficult to increase the content of unsaturations in SSC PE resins.

One way of introducing unsaturation into the backbone of a single site produced polyethylene is to employ dienes or other multifunctional compounds as comonomers. However, these comonomers have rather high odour, low reactivity, and residual unreacted comonomers maybe hard to remove, causing unacceptable organoleptic properties.

The conventional route therefore to achieving highly unsaturated polymers is by employing a particular catalyst which is autoterminating, e.g. Cr catalysts. Polymers made using Cr catalysis typically have one unsaturation per polymer molecule. It is known, however, that these catalysts give broad molecular weight distribution polyethylenes (e.g. Mw/Mn values of much greater than 10) which are not favoured in the crosslinking process and, as they form oligomers, which are associated with unacceptable organoleptic properties.

One solution might be therefore to use the single site materials and tolerate the low level of unsaturation present and simply add more cross-linking agent to achieve the necessary cross-linking degree. However to cross-link such a polymer requires much higher levels of cross-linking agents or doses of radiation to achieve a certain degree of X-linking. This has cost, odour and safety implications and is not favoured.

There remains therefore a need to produce single site polyethylene (SSC PE) resins for PEX pipe applications but with increased levels of unsaturation to mimic chromium polyethylene like unsaturations but with narrow molecular weight distribution and good organoleptic properties. The polymer should also possess good processability and pipes formed from the polymer should have advantageous torque properties.

WO2010/049170 discloses single site catalysed polymers with Mw/Mn values of less than 5 but hydrogen is used in their formation. The absence of hydrogen is important during manufacturing to achieve the necessary unsaturation content which forms part of the invention. Hydrogen is used both in loop and gas phases in the examples of WO2010/049170.

US2003/0130445 describes polypropylene polymers which may contain ethylene as a comonomer but these polymers are not polyethylenes which must have a high ethylene content.

The abstract of JP03-099832 discusses the formation of crosslinked polyethylene pipes using a radical generating agent, silane compound and powdery polyethylene where the number of double bonds per 1000 C atoms is 0.5 or more. The Mw/Mn values are not reported as being low as required herein.

U.S. Pat. No. 5,446,221 is not in the field of pipes but the polymers therein are characterised by a high terminal ethenylidene type unsaturation in which 95% or more of the polymer chains possess such an unsaturation. The ethylene content of the polymers in U.S. Pat. No. 5,446,221 is however, 20 to 80 wt % and these polymers are therefore rubbers. At the comonomer content levels in U.S. Pat. No. 5,446,221, very low densities will be exhibited.

SUMMARY OF THE INVENTION

The inventors have now solved the problem above by realising that when a propagating polyethylene molecule is terminated by autotermination instead of termination by hydrogen, it is likely that the molecule becomes mono-unsaturated. This means that in principle it would be possible to make SSC PE with one unsaturation per molecule and hence to mimic the performance of Cr catalyst produced polyethylene.

The inventors have realised that unsaturation can be encouraged in a single site produced material by avoiding the use of hydrogen in the manufacturing process. This allows autotermination to dominate the chain termination reaction and allows unsaturated end groups to form. Since a single site catalyst is employed the draw backs of the use of Cr-PE are avoided whilst still achieving a useful product.

As hydrogen is not employed in the polymerisation process, there is, however, no longer an agent which controls molecular weight. It is essential, however, that molecular weight is controlled in some fashion. Failure to control molecular weight would lead to high molecular weight polymers with broad molecular weight distribution and would partially defeat the objection of the invention.

The inventors have therefore employed other parameters to achieve Mw control. In particular, the inventors can employ catalysts with different Mw capabilities, e.g. Hf and Zr based metallocenes as discussed further below. It is also possible to manipulate molecular weight by varying partial pressure of ethylene. Higher partial pressures lead to higher catalyst activity and lower partial pressures lead to lower catalyst activity. Strict control over temperature can also be used to control molecular weight and the use of different comonomers and comonomer concentrations can also be used to change molecular weight. This allows the formation of SSC polymers with uncharacteristically high levels of unsaturation whilst also having relatively low weight average and/or number average molecular weight.

Thus viewed from one aspect the invention provides a single site catalysed ethylene polymer comprising ethylene and optionally at least one comonomer having a Mw/Mn of less than 5, a density of at least 930 kg/m$^3$ and wherein the total amount of unsaturations in the ethylene polymer (per average molecule) is at least 0.8.

Viewed from another aspect the invention provides an ethylene polymer comprising ethylene and optionally at least one comonomer having a Mw/Mn of less than 5, a density of at least 930 kg/m³ and wherein the total amount of unsaturations in the ethylene polymer (per average molecule) is at least 0.8.

Viewed from another aspect the invention provides a composition comprising an ethylene polymer as hereinbefore defined.

Viewed from another aspect the invention provides the use of an ethylene polymer as hereinbefore described in the manufacture of a pipe, especially a cross-linked pipe.

Viewed from another aspect the invention provides a process for the preparation of a crosslinked ethylene polymer pipe comprising forming the ethylene polymer as hereinbefore described into a pipe by extrusion and crosslinking it.

Viewed from another aspect the invention provides a cross-linked pipe comprising a single site catalysed ethylene polymer comprising ethylene and optionally at least one comonomer having a Mw/Mn of less than 5 and wherein the total amount of unsaturations of the ethylene polymer is at least 0.8 wherein said pipe has a torque max value of at least 7 dNm.

Viewed from another aspect the invention provides a cross-linked pipe comprising an ethylene polymer comprising ethylene and optionally at least one comonomer having a Mw/Mn of less than 5 and wherein the total amount of unsaturations of the ethylene polymer is at least 0.8 wherein said pipe has a torque max value of at least 7 dNm.

Viewed from another aspect the invention provides a single site catalysed ethylene polymer comprising ethylene and optionally at least one comonomer having a Mw/Mn of less than 5, a density of at least 930 kg/m³ and wherein the total amount of unsaturations in the ethylene polymer is at least 0.25/1000 C.

Viewed from another aspect the invention provides an ethylene polymer comprising ethylene and optionally at least one comonomer having a Mw/Mn of less than 5, a density of at least 930 kg/m³ and wherein the total amount of unsaturations in the ethylene polymer is at least 0.25/1000 C.

These and other features of the present application and the resultant patent will become apparent to one of ordinary skill in the art upon review of the following detailed description when taken in conjunction with the drawing and appended claims.

DETAILED DESCRIPTION OF THE INVENTION

Ethylene Polymer

The techniques used to measure all the parameters in the discussion which follows and in the statements above, are presented at the start of the examples section.

By ethylene polymer is meant a polymer in which ethylene is the major repeating unit, e.g. at 70 wt % ethylene, preferably at least 85 wt % ethylene.

The ethylene polymer of the present invention has a density of less than 955 kg/m³, preferably less than 954 kg/m³. Ideally the polymer will have a density of at least 930 kg/m³, e.g. at least 935 kg/m³. A preferred density range may be 932-955 kg/m³, especially 940 to 955 kg/m³. This density is made possible by the single-site catalysed polymerisation of the ethylene polymer and has several advantages. The lower than normal density polymer means that the pipe prepared therefrom is more flexible. This is of importance, inter alia, for pipes intended, e.g. for floor heating. Further, a lower density ethylene polymer base resin means a lower crystallinity which in turn means that less energy is required to melt the polymer. This results in an enhanced production speed when manufacturing pipes.

The ethylene polymer of the invention preferably has a $MFR_{21}$ of 5-50 g/10 min, more preferably 10 to 40 g/10 min, especially 20 to 35 g/10 min. The MFR is an indication of the flowability, and hence the processability, of the polymer. The higher the melt flow rate, the lower the viscosity of the polymer. MFR is also important to ensure sufficient cross-linking ability.

$MFR_2$ values may range from 0.1 to 5 g/10 min. Ideally the $MFR_2$ value is in the range 0.5 to 3 g/10 min.

The ethylene polymers of the invention preferably have molecular weight, Mw, of at least 80,000, preferably at least 100,000. Very high Mw is not favoured. Mw should not be greater than 250,000, e.g. no more than 200,000.

Mn values are preferably at least 25,000, more preferably at least 30,000, especially at least 35,000. Mn values are preferably 75,000 or less. Nevertheless, the Mn values are considerably higher than those of Cr-PE polymers which makes achieving the same level of unsaturation difficult. As there are simply more carbon atoms in the ethylene polymers of the invention, it is obviously harder to maintain a high unsaturated content across the whole molecule. This is however, achieved by the invention.

The single-site catalysed ethylene polymer of the present invention has a narrow molecular weight distribution as defined by its shear thinning index (SHI). The SHI is the ratio of the complex viscosity ($\eta^*$) at two different shear stresses and is a measure of the broadness (or narrowness) of the molecular weight distribution.

According to the present invention the ethylene polymer has a shear thinning index SHI1/100, i.e. a ratio of the complex viscosity at 190° C. and a shear stress of 1 kPa($\eta^*1$) and the complex viscosity at 190° C. and a shear stress of 100 kPa($\eta^*100$), of less than 5, preferably less than 3.

Another way to measure molecular weight distribution (MWD) is by GPC. The molecular weight distribution (MWD value i.e. Mw/Mn) according to the present invention less than 5, preferably less than 4, especially less than 3. The narrow molecular weight distribution enhances crosslinkability, e.g. less peroxide or radiation is required to obtain a certain crosslinking degree compared to known pipe polymers such as $CrO_3$ catalysed polymers.

According to a preferred embodiment of the invention the ethylene polymer has a complex viscosity at a shear stress of 300 kPa/190° C., n*300 kpa/190° C., of less than 1100 Pas.

According to another preferred embodiment of the invention the ethylene polymer has a complex viscosity at a shear stress of 0.05 kPa/190° C., n*0.05 kpa/190° C., of less than 4500 Pas, more preferably less than 4,000 Pas. The minimum value may be 1500 Pas. These values illustrate that the polymers of the invention are easily processable. This is despite the relatively high levels of unsaturation in the polymers. The combination of good processability and high levels of unsaturation gives rise to a highly valuable polymer product. This is product which can be easily extruded to form a pipe and is also one that can undergo cross-linking with acceptable levels of cross-linking aids. This is an important advantage of the invention.

The ethylene polymer of the invention has a high quantity of unsaturated groups for a single site produced polymer. The "total amount of unsaturated groups, i.e. the total carbon-carbon double bonds" is defined as the combined amount of double bonds which originate from vinyl groups, vinylidene groups and trans-vinylene groups, if present. The polyolefin does not necessarily contain all the above three types of double bonds. However, any of the three types, when present, is calculated to the "total amount of carbon-carbon double bonds". The amount of each type of double bond is measured as indicated below.

A typically single site polymer when used in the presence of hydrogen gives rise to a level of unsaturation which is very low, typically less than 0.1 unsaturations per 1000 carbon atoms.

The polymer of the invention preferably contains carbon-carbon double bonds/1000 carbon atoms in a total amount of at least 0.2/1000 carbon atoms, preferably at least 0.3/1000 carbon atoms. The number of unsaturations can be at least 3, preferably at least 5 times that of an otherwise similar polymer made in the presence of hydrogen.

The unsaturations may be broken down into at least 0.2 trans-vinylidene groups per 1000C, e.g. at least 0.25 trans-vinylidene groups. In addition there may be at least 0.05 vinyl groups per 1000C. In addition there may be at least 0.01 vinylidene groups per 1000C.

The most preferred feature of the invention is however, that this level of unsaturations can be achieved with a narrow molecular weight distribution and also at a valuable molecular weight.

The total amount of unsaturations of the ethylene polymer is at least 0.8, preferably at least 0.9, especially at least 1, e.g. about 1 per molecule.

For the avoidance of doubt, the total amount of unsaturations of the ethylene polymer is calculated as follows. The illustration is based on the data in the examples. The Mn of a polymer is 46000 g/mol. The number of carbon atoms in the average molecule is therefore 46000/14 (as 14 is the Mw of —$CH_2$—). That is 3286 carbon atoms.

The number of unsaturations is calculated as 0.354 per 1000 carbon atoms. There are therefore 1.16 unsaturations per (average) molecule. The parameter therefore total saturations is 1.16.

The ethylene polymer of the invention can be multimodal but is preferably unimodal in order to maintain a narrow molecular weight distribution. The term "unimodal" means herein, unless otherwise stated, unimodality with respect to molecular weight distribution. The GPC curve of such a polymer will contain a single peak.

The ethylene polymer of the invention can be a homopolymer or a copolymer. By copolymer is meant a polymer formed from ethylene with at least one other comonomer, e.g. C3-20 alpha olefin. Preferred comonomers are C3-20 alpha-olefins, especially with 3-8 carbon atoms. Ideally, the polymer is diene and/or polyene free.

Preferably, the comonomer is selected from the group consisting of propene, 1-butene, 1-hexene, 4-methyl-1-pentene, and 1-octene, especially propene, 1-butene, or 1-hexene.

The polymers of the invention can comprise one monomer or two monomers or more than 2 monomers. The use of a single comonomer is preferred.

The amount of comonomer is preferably such that it comprises 0-3 mol %, more preferably 0-1.5 mol % and most preferably 0-0.5 mol % of the ethylene polymer.

It is preferred however if the ethylene polymer of the invention is a homopolymer, i.e. contains ethylene only.

The ethylene polymer of the invention is prepared by single-site catalysed polymerisation and has a narrow molecular weight distribution. The use of a single-site catalysed ethylene polymer gives better pressure test performance for a given density level than corresponding prior art materials. Further, the use of single site catalysed low MFR polymer allows a lower amount of crosslinking agent to be used to reach the desired degree of crosslinking. The polyethylene as defined above may be made using any conventional single site catalysts, including metallocenes and non-metallocenes as well known in the field.

Preferably said catalyst is one comprising a metal coordinated by one or more η-bonding ligands. Such η-bonded metals are typically transition metals of Group 3 to 10, e.g. Zr, Hf or Ti, especially Zr or Hf. The η-bonding ligand is typically an $\eta^5$-cyclic ligand, i.e. a homo or heterocyclic cyclopentadienyl group optionally with fused or pendant substituents. Such single site, preferably metallocene, procatalysts have been widely described in the scientific and patent literature for about twenty years. Procatalyst refers herein to said transition metal complex.

The metallocene procatalyst may have a formula II:

$$(Cp)_m R_n MX_q \quad\quad\quad (II)$$

wherein:

each Cp independently is an unsubstituted or substituted and/or fused homo- or heterocyclopentadienyl ligand, e.g. substituted or unsubstituted cyclopentadienyl, substituted or unsubstituted indenyl or substituted or unsubstituted fluorenyl ligand;

the optional one or more substituent(s) being independently selected preferably from halogen, hydrocarbyl (e.g. $C_1$-$C_{20}$-alkyl, $C_2$-$C_{20}$-alkenyl, $C_2$-$C_{20}$-alkynyl, $C_3$-$C_{12}$-cycloalkyl, C6-$C_{20}$-aryl or $C_7$-$C_{20}$-arylalkyl), $C_3$-$C_{12}$-cycloalkyl which contains 1, 2, 3 or 4 heteroatom(s) in the ring moiety, $C_6$-$C_{20}$-heteroaryl, $C_1$-$C_{20}$-haloalkyl, —$SiR''_3$, —$OSiR''_3$, —$SR''$, —$PR''_2$ or —$NR''_2$, each R" is independently a hydrogen or hydrocarbyl, e.g. $C_1$-$C_{20}$-alkyl, $C_2$-$C_{20}$-alkenyl, $C_2$-$C_{20}$-alkynyl, $C_3$-$C_{12}$-cycloalkyl or $C_6$-$C_{20}$-aryl; or e.g. in case of —$NR''_2$, the two substituents R" can form a ring, e.g. five- or six-membered ring, together with the nitrogen atom to which they are attached;

R is a bridge of 1-7 atoms, e.g. a bridge of 1-4 C-atoms and 0-4 heteroatoms, wherein the heteroatom(s) can be e.g. Si, Ge and/or O atom(s), wherein each of the bridge atoms may bear independently substituents, such as $C_{1-20}$-alkyl, tri($C_{1-20}$-alkyl)silyl, tri($C_{1-20}$-alkyl)siloxy or $C_{6-20}$-aryl substituents); or a bridge of 1-3, e.g. one or two, hetero atoms, such as silicon, germanium and/or oxygen atom(s), e.g. —$SiR^1_2$—, wherein each $R^1$ is independently $C_{1-20}$-alkyl, $C_{6-20}$-aryl or tri($C_{1-20}$-alkyl)silyl-residue, such as trimethylsilyl;

M is a transition metal of Group 3 to 10, preferably of Group 4 to 6, such as Group 4, e.g. Ti, Zr or Hf, especially Hf;

each X is independently a sigma-ligand, such as H, halogen, $C_{1-20}$-alkyl, $C_{1-20}$-alkoxy, $C_2$-$C_{20}$-alkenyl, $C_2$-$C_{20}$-alkynyl, C3-C12-cycloalkyl, C6-$C_{20}$-aryl, C6-$C_{20}$-aryloxy, C7-$C_{20}$-arylalkyl, C7-C20-arylalkenyl, —$SR''$, —$PR''_3$, —$SiR''_3$, —$OSiR''_3$, —$NR''_2$ or —$CH_2$—Y, wherein Y is C6-C20-aryl, C6-C20-heteroaryl, C1-$C_{20}$-alkoxy, C6-C20-aryloxy, $NR''_2$, —$SR''$, —$PR''_3$, —$SiR''_3$, or —$OSiR''_3$;

each of the above mentioned ring moieties alone or as a part of another moiety as the substituent for Cp, X, R" or R1 can further be substituted e.g. with C1-C20-alkyl which may contain Si and/or O atoms;

n is 0, 1 or 2, e.g. 0 or 1, m is 1, 2 or 3, e.g. 1 or 2, q is 1, 2 or 3, e.g. 2 or 3, wherein m+q is equal to the valency of M.

Suitably, in each X as —CH$_2$—Y, each Y is independently selected from C6-C20-aryl, NR"$_2$, —SiR"$_3$ or —OSiR"$_3$. Most preferably, X as —CH$_2$—Y is benzyl. Each X other than —CH$_2$—Y is independently halogen, C1-C20-alkyl, C1-C20-alkoxy, C6-C20-aryl, C7-C20-arylalkenyl or —NR"$_2$ as defined above, e.g. —N(C1-C20-alkyl)$_2$.

Preferably, q is 2, each X is halogen or —CH$_2$—Y, and each Y is independently as defined above.

Cp is preferably cyclopentadienyl, indenyl, tetrahydroindenyl or fluorenyl, optionally substituted as defined above.

In a suitable subgroup of the compounds of formula II, each Cp independently bears 1, 2, 3 or 4 substituents as defined above, preferably 1, 2 or 3, such as 1 or 2 substituents, which are preferably selected from C1-C20-alkyl, C6-C20-aryl, C7-C20-arylalkyl (wherein the aryl ring alone or as a part of a further moiety may further be substituted as indicated above), —OSiR"$_3$, wherein R" is as indicated above, preferably C1-C20-alkyl.

R, if present, is preferably a methylene, ethylene or a silyl bridge, whereby the silyl can be substituted as defined above, e.g. a (dimethyl)Si=, (methylphenyl)Si=or (trimethylsilylmethyl)Si=; n is 0 or 1; m is 2 and q is two. Preferably, R" is other than hydrogen.

A specific subgroup includes the well known metallocenes of Zr, Hf and Ti with two η-5-ligands which may be bridged or unbridged cyclopentadienyl ligands optionally substituted with e.g. siloxy, or alkyl (e.g. C1-6-alkyl) as defined above, or with two unbridged or bridged indenyl ligands optionally substituted in any of the ring moieties with e.g. siloxy or alkyl as defined above, e.g. at 2-, 3-, 4- and/or 7-positions. Preferred bridges are ethylene or —SiMe$_2$.

The preparation of the metallocenes can be carried out according or analogously to the methods known from the literature and is within skills of a person skilled in the field. Thus for the preparation see e.g. EP-A-129 368, examples of compounds wherein the metal atom bears a —NR"$_2$ ligand see i.a. in WO-A-9856831 and WO-A-0034341. For the preparation see also e.g. in EP-A-260 130, WO-A-9728170, WO-A-9846616, WO-A-9849208, WO-A-9912981, WO-A-9919335, WO-A-9856831, WO-A-00/34341, EP-A-423 101 and EP-A-537 130.

Alternatively, in a further subgroup of the metallocene compounds, the metal bears a Cp group as defined above and additionally a η1 or η2 ligand, wherein said ligands may or may not be bridged to each other. Such compounds are described e.g. in WO-A-9613529, the contents of which are incorporated herein by reference.

Further preferred metallocenes include those of formula (I)

Cp'$_2$M'X'$_2$.

wherein each X' is halogen, C$_{1-6}$ alkyl, benzyl or hydrogen;
M' is Hf or Zr;
Cp' is a cyclopentadienyl or indenyl group optionally substituted by a C$_{1-10}$ hydrocarbyl group or groups and being optionally bridged, e.g. via an ethylene or dimethylsilyl link.

Especially preferred catalysts are bis-(n-butyl cyclopentadienyl) hafnium dibenzyl, and bis-(n-butyl cyclopentadienyl) zirconium dichloride.

Metallocene procatalysts are generally used as part of a catalyst system which also includes a catalyst activator, called also as cocatalyst. Useful activators are, among others, aluminium compounds, like aluminium alkoxy compounds. Suitable aluminium alkoxy activators are for example methylaluminoxane (MAO), hexaisobutylaluminoxane and tetraisobutylaluminoxane. In addition boron compounds (e.g. a fluoroboron compound such as triphenylpentafluoroboron or triphentylcarbenium tetraphenylpentafluoroborate ((C$_6$H$_5$)$_3$B+B—(C$_6$F$_5$)$_4$)) can be used as activators. The cocatalysts and activators and the preparation of such catalyst systems is well known in the field. For instance, when an aluminium alkoxy compound is used as an activator, the Al/M molar ratio of the catalyst system (Al is the aluminium from the activator and M is the transition metal from the transition metal complex) is suitable from 50 to 500 mol/mol, preferably from 100 to 400 mol/mol. Ratios below or above said ranges are also possible, but the above ranges are often the most useful.

If desired the procatalyst, procatalyst/cocatalyst mixture or a procatalyst/cocatalyst reaction product may be used in supported form (e.g. on a silica or alumina carrier), unsupported form or it may be precipitated and used as such. One feasible way for producing the catalyst system is based on the emulsion technology, wherein no external support is used, but the solid catalyst is formed from by solidification of catalyst droplets dispersed in a continuous phase. The solidification method and further feasible metallocenes are described e.g. in WO03/051934 which is incorporated herein as a reference.

It is also possible to use combinations of different activators and procatalysts. In addition additives and modifiers and the like can be used, as is known in the art.

Any catalytically active catalyst system including the procatalyst, e.g. metallocene complex, is referred herein as single site or metallocene catalyst (system).

Preparation of Cross-Linkable Polymer

For the preparation of the ethylene polymer of the present invention polymerisation methods well known to the skilled person may be used. Solution, slurry, or gas phase processes can be employed. It is however vital that hydrogen is not used in any polymerisation. Ideally slurry polymerisation is employed, e.g. in a loop reactor.

The conditions used in such a process are well known. For slurry reactors, the reaction temperature will generally be in the range 60 to 110° C., e.g. 85-110° C., the reactor pressure will generally be in the range 5 to 80 bar, e.g. 50-65 bar, and the residence time will generally be in the range 0.3 to 5 hours, e.g. 0.5 to 2 hours. The diluent used will generally be an aliphatic hydrocarbon having a boiling point in the range –70 to +100° C., e.g. propane. In such reactors, polymerization may if desired be effected under supercritical conditions. Slurry polymerisation may also be carried out in bulk where the reaction medium is formed from the monomer being polymerised.

For gas phase reactors, the reaction temperature used will generally be in the range 60 to 115° C., e.g. 70 to 110° C., the reactor pressure will generally be in the range 10 to 25 bar, and the residence time will generally be 1 to 8 hours. The gas used will commonly be a non-reactive gas such as nitrogen or low boiling point hydrocarbons such as propane together with monomer, e.g. ethylene.

A prepolymerisation step may precede the actual polymerisation process although this is not preferred.

Figure 1:
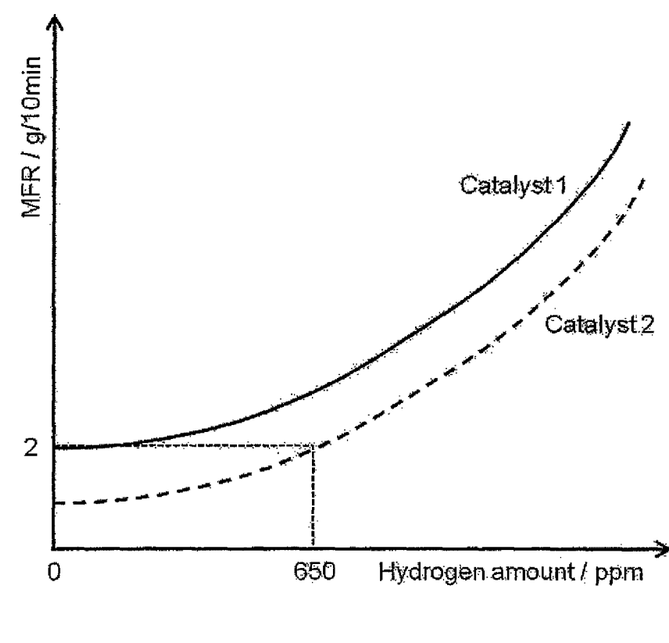

As hydrogen is not used to control molecular weight, other ways of controlling molecular weight must be used. The inventors have therefore employed other parameters to achieve Mw control. In particular, the inventors employ catalysts with different Mw capabilities. FIG. 1 illustrates this. The catalyst of example 1 has a higher MFR value than that of example 2. The figure shows that an amount of hydrogen has to be added to ensure that the Mw attained by catalyst 2 matches that of catalyst 1. It is also possible to manipulate molecular weight by varying partial pressure of ethylene. Higher partial pressures lead to increased productivity, also slightly increasing the molecular weight. Strict control over temperature can be used to control molecular weight and the use of different comonomers and comonomer concentrations can also be used to change molecular weight.

Thus, suitable partial pressures of ethylene, in particular in a slurry reaction, are 50 to 80 bar. The reaction temperature is preferably between 80 and 100° C. It is also preferred if the use of hydrogen is avoided completely in the process.

Viewed from another aspect the invention provides a process for the preparation of an ethylene polymer as hereinbefore defined comprising polymerising ethylene and optionally at least one comonomer in the presence of a single site catalyst and in the absence of hydrogen so as to form said ethylene polymer.

The ethylene polymer of the invention can be blended with any other polymer of interest or used on its own as the only olefinic material in an article. Thus, the ethylene polymer of the invention can be blended with known HDPE, MDPE, LDPE, LLDPE polymers or a mixture of ethylene polymers of the invention could be used.

The ethylene polymer of the invention may be blended with standard additives, fillers and adjuvants known in the art. It may also contain additional polymers, such as carrier polymers of the additive masterbatches. Preferably the ethylene polymer comprises at least 50% by weight of any polymer composition containing the ethylene polymer, preferably at least 80% by weight and more preferably at least 85% by weight, based on the total weight of the composition.

Suitable antioxidants and stabilizers are, for instance, sterically hindered phenols, phosphates or phosphonites, sulphur containing antioxidants, alkyl radical scavengers, aromatic amines, hindered amine stabilizers and the blends containing compounds from two or more of the above-mentioned groups.

Examples of sterically hindered phenols are, among others, 2,6-di-tert-butyl-4-methyl phenol (sold, e.g., by Degussa under a trade name of Ionol CP), pentaerythrityl-tetrakis(3-(3',5'-di-tert. butyl-4-hydroxyphenyl)-propionate (sold, e.g., by BASF under the trade name of Irganox 1010) octadecyl-3-3(3'5'-di-tert-butyl-4'-hydroxyphenyl)propionate (sold, e.g., by BASF under the trade name of Irganox 1076) and 2,5,7,8-tetramethyl-2(4',8',12'-trimethyltridecyl) chroman-6-ol (sold, e.g., by BASF under the trade name of Alpha-Tocopherol).

Examples of phosphates and phosphonites are tris(2,4-di-t-butylphenyl) phosphite (sold, e.g., by BASF under the trade name of Irgafos 168), tetrakis-(2,4-di-t-butylphenyl)-4,4'-biphenylen-di-phosphonite (sold, e.g., by BASF under the trade name of Irgafos P-EPQ) and tris-(nonylphenyl) phosphate (sold, e.g., by Dover Chemical under the trade name of Doverphos HiPure 4).

Examples of sulphur-containing antioxidants are dilauryl-thiodipropionate (sold, e.g., by BASF under the trade name of Irganox PS 800), and distearylthiodipropionate (sold, e.g., by Chemtura under the trade name of Lowinox DSTDB).

Examples of nitrogen-containing antioxidants are 4,4'-bis (1,1'-dimethylbenzyl)diphenylamine (sold, e.g., by Chemtura under the trade name of Naugard 445), polymer of 2,2,4-trimethyl-1,2-dihydroquinoline (sold, e.g., by Chemtura under the trade name of Naugard EL-17), p-(p-toluene-sulfonylamido)-diphenylamine (sold, e.g., by Chemtura under the trade name of Naugard SA) and N,N'-diphenyl-p-phenylene-diamine (sold, e.g., by Chemtura under the trade name of Naugard J).

Commercially available blends of antioxidants and process stabilizers are also available, such as Irganox B225, Irganox B215 and Irganox B561 marketed by Ciba-Geigy.

Suitable acid scavengers are, for instance, metal stearates, such as calcium stearate and zinc stearate. They are used in amounts generally known in the art, typically from 500 ppm to 10000 ppm and preferably from 500 to 5000 ppm.

Carbon black is a generally used pigment, which also acts as an UV-screener. Typically carbon black is used in an amount of from 0.5 to 5% by weight, preferably from 1.5 to 3.0% by weight. Preferably the carbon black is added as a masterbatch where it is premixed with a polymer, preferably high density polyethylene (HDPE), in a specific amount. Suitable masterbatches are, among others, HD4394, sold by Cabot Corporation, and PPM1805 by Poly Plast Muller. Also titanium oxide may be used as an UV-screener.

Pipe

The polymer of the invention is cross-linkable and is ideal for use in the formation of cross-linked pipes. Cross-linking of the polymer/pipe can be achieved in conventional ways e.g. using peroxide, irradiation or silane cross-linkers. In peroxide crosslinking, the crosslinking takes place by the addition of peroxide compounds, such as dicumyl peroxide, which form free radicals. Cross-linking can also be achieved by irradiation or using silanes.

At a predetermined amount of peroxide or irradiation, a lower molecular weight (higher MFR) polymer may be used than in the prior art. According to the present invention the absence of very low molecular weight tail in single-site catalyst polymers results in improved crosslinkability.

Low molecular weight polymers require a higher amount of peroxide to achieve an efficient network structure.

Peroxide cross-linking is preferred, especially with 2,5-dimethyl-2,5-ditertbutylperoxy hexyne (known commercially as Trigonox 145 E85).

The polymers of the invention can exhibit a cross-linking degree of at least 55%, e.g. at least 58% as measured according to ASTM D 2765-01, Method A when using 0.4% Triganox 145 E85. (Triganox 145 E 85 is an oil solution that contains 85 wt-% peroxide. The peroxide is diluted in the oil the make it less hazardous)

It is preferred if the ethylene polymer of the invention has a degree of crosslinking corresponding to a torque max of at least 7 dNm after 3.5 minutes as measured by Monsanto device when using 0.4% peroxide, especially 0.4% Trig 145 (see above). Torque max is significantly higher for the ethylene polymers of the invention than other SSC materials. Torque max values of at least 7.5 dNm can also be achieved.

The delta torque value is also high and can be at least 7. When looking at the Torque ratio, meaning the final torque divided by the initial torque, the invention performs much better. The Torque ratio may be at least 30, preferably at least 35, especially at least 40.

Furthermore, the T90 value (time to reach 90% of the final crosslinking value) is faster for the polymers of the invention than for polymers manufactured using hydrogen. The present invention enables a cross-linking degree of 60% to be achieved in less than 3 minutes 30 seconds.

Pipes according to the present invention are produced according to the methods known in the art. Thus, according to one preferred method the polymer composition is extruded through an annular die to a desired internal diameter, after which the polymer composition is cooled.

The pipe extruder preferably operates at a relatively low temperature and therefore excessive heat build-up should be avoided. Extruders having a high length to diameter ratio L/D more than 15, preferably of at least 20 and in particular of at least 25 are preferred. The modern extruders typically have an L/D ratio of from about 30 to 35.

The polymer melt is extruded through an annular die, which may be arranged either as end-fed or side-fed configuration. The side-fed dies are often mounted with their axis parallel to that of the extruder, requiring a right-angle turn in the connection to the extruder. The advantage of side-fed dies is that the mandrel can be extended through the die and this allows, for instance, easy access for cooling water piping to the mandrel.

After the plastic melt leaves the die it is calibrated to the correct diameter. In one method the extrudate is directed into a metal tube (calibration sleeve). The inside of the extrudate is pressurised so that the plastic is pressed against the wall of the tube. The tube is cooled by using a jacket or by passing cold water over it.

According to another method a water-cooled extension is attached to the end of the die mandrel. The extension is thermally insulated from the die mandrel and is cooled by water circulated through the die mandrel. The extrudate is drawn over the mandrel which determines the shape of the pipe and holds it in shape during cooling. Cold water is flowed over the outside pipe surface for cooling.

According to still another method the extrudate leaving the die is directed into a tube having perforated section in the centre. A slight vacuum is drawn through the perforation to hold the pipe hold the pipe against the walls of the sizing chamber.

After the sizing the pipe is cooled, typically in a water bath having a length of about 5 metres or more.

The pipes according to the present invention can fulfil the requirements of PE80 standard as defined in EN 12201 and EN 1555, alternatively ISO 4427 and ISO 4437, evaluated according to ISO 9080.

Generally, polymer pipes are manufactured by extrusion therefore, or, to a smaller extent, by injection moulding. A conventional plant for screw extrusion of PEX polymer pipes comprises a single or double screw extruder, a nozzle, a calibrating device, a crosslinking unit, cooling equipment, a pulling device, and a device for cutting or for coiling-up the pipe. The polymer, pre-soaked with a suitable amount of peroxide is extruded into a pipe from the extruder and thereafter the pipe is crosslinked in the crosslinking unit. This process step requires that the pipe has sufficient melt strength so that the uncrosslinked pipe does not collapse before it gets to the crosslinking unit. This screw extrusion technique is well known to the skilled person and no further particulars should therefore be necessary here.

Another type of extrusion of polymer pipes is the so-called ram extrusion where peroxide soaked polymer powder is charged batchwise into an extrusion cylinder and compressed with a ram in the heated zone of the extrusion cylinder. Melting and crosslinking of the polymer takes place simultaneously. After a charge has been pressed the ram is lifted, the crosslinked pipe is expelled and another charge of polymer is metered into the extrusion cylinder.

The pipe of the present invention is prepared by extrusion and more particularly by screw extrusion or ram extrusion.

As indicated above, a problem that may be encountered, particularly when increasing the output by using a polymer having a higher MFR, when extruding a polymer pipe and crosslinking it in a separate, downstream crosslinking unit, is that the polymer parison that leaves the extruder has insufficient melt strength. This may result in the parison collapsing.

According to a preferred embodiment of the invention this problem of insufficient melt strength is overcome by adding a small amount of peroxide to the polymer before the extrusion in order to decompose the peroxide during the extrusion and introducing long-chain branching in the polymer. The long-chain branching introduced during the extrusion affords the polymer that leaves the extruder with enhanced melt strength so that the pipe parison does not collapse, but maintains its shape until it reaches the downstream crosslinking unit where it is crosslinked to the final crosslinking degree. The peroxide added to introduce long-chain branching should have a decomposition temperature below about 150° C. in order to decompose readily during the extrusion. The amount of such peroxide added should be enough to introduce the desired amount of long-chain branching, and should preferably be less than 500 ppm, more preferably 50-500 ppm, and still more preferably 100-500 ppm. The peroxide used for the crosslinking of the pipe in the downstream crosslinking unit should have a higher decomposition temperature such as at least 150° C., preferably at least 160° C., and more preferably 160-200° C.

The higher decomposition temperature of this second peroxide should ensure that it does not decompose prematurely during the extrusion of the polymer.

It will be appreciated that the preferred features of the polymers of the invention as described herein can all be combined with each other in any way.

The invention will now be described with reference to the following non limiting examples and figure. FIG. 1 shows the hydrogen response of the catalysts of the invention, showing that a zero hydrogen, the catalyst 1 produces a higher MFR polymer than catalyst 2.

Analytical Tests

Melt Index

The melt flow rate (MFR) is determined according to ISO 1133 and is indicated in g/10 min. The MFR is an indication of the melt viscosity of the polymer. The MFR is determined at 190° C. for PE. The load under which the melt flow rate is determined is usually indicated as a subscript, for instance $MFR_2$ is measured under 2.16 kg load (condition D), $MFR_5$ is measured under 5 kg load (condition T) or $MFR_{21}$ is measured under 21.6 kg load (condition G).

The quantity FRR (flow rate ratio) is an indication of molecular weight distribution and denotes the ratio of flow rates at different loads. Thus, $FRR_{21/2}$ denotes the value of $MFR_{21}/MFR_2$.

Density

Density of the polymer was measured according to ISO 1183/1872-2B.

For the purpose of this invention the density of the blend can be calculated from the densities of the components according to:

$$\rho_b = \sum_i w_i \cdot \rho_i$$

where $\rho_b$ is the density of the blend,
$w_i$ is the weight fraction of component "i" in the blend and
$\rho_i$ is the density of the component "i".

Molecular Weight

Mw, Mn and MWD are measured by Gel Permeation Chromatography (GPC) according to the following method:

The weight average molecular weight Mw and the molecular weight distribution (MWD=Mw/Mn wherein Mn is the number average molecular weight and Mw is the weight average molecular weight) is measured according to ISO 16014-4:2003 and ASTM D 6474-99. A Waters GPCV2000 instrument, equipped with refractive index detector and online viscosimeter was used with 2×GMHXL-HT and 1×G7000HXL-HT TSK-gel columns from Tosoh Bioscience and 1,2,4-trichlorobenzene (TCB, stabilized with 250 mg/L 2,6-Di tert-butyl-4-methyl-phenol) as solvent at 140° C. and at a constant flow rate of 1 mL/min. 209.5 μL of sample solution were injected per analysis. The column set was calibrated using universal calibration (according to ISO 16014-2:2003) with at least 15 narrow MWD polystyrene (PS) standards in the range of 1 kg/mol to 12 000 kg/mol. Mark Houwink constants were used as given in ASTM D 6474-99. All samples were prepared by dissolving 0.5-4.0 mg of polymer in 4 mL (at 140° C.) of stabilized TCB (same as mobile phase) and keeping for max. 3 hours at a maximum temperature of 160° C. with continuous gentle shaking prior sampling in into the GPC instrument.

As it is known in the art, the weight average molecular weight of a blend can be calculated if the molecular weights of its components are known according to:

$$Mw_b = \sum_i w_i \cdot Mw_i$$

where $Mw_b$ is the weight average molecular weight of the blend,
$w_i$ is the weight fraction of component "i" in the blend and
$Mw_i$ is the weight average molecular weight of the component "i".

The number average molecular weight can be calculated using the well-known mixing rule:

$$\frac{1}{Mn_b} = \sum_i \frac{w_i}{Mn_i}$$

where $Mn_b$ is the weight average molecular weight of the blend,
$w_i$ is the weight fraction of component "i" in the blend and
$Mn_i$ is the weight average molecular weight of the component "i".

Quantification of the Amount of Carbon-Carbon Double Bonds by IR Spectroscopy

Quantitative infrared (IR) spectroscopy was used to quantify the amount of carbon-carbon doubles (C=C). Calibration was achieved by prior determination of the molar extinction coefficient of the C=C functional groups in representative low molecular weight model compounds of known structure.

The amount of each of these groups (N) was determined as number of carbon-carbon double bonds per thousand total carbon atoms (C=C/1000C) via:

$$N=(A \times 14)/(E \times L \times D)$$

were A is the maximum absorbance defined as peak height, E the molar extinction coefficient of the group in question ($1 \cdot mol^{-1} \cdot mm^{-1}$), L the film thickness (mm) and D the density of the material ($g \cdot cm^{-1}$).

The total amount of C=C bonds per thousand total carbon atoms can be calculated through summation of N for the individual C=C containing components.

For polyethylene samples solid-state infrared spectra were recorded using a FTIR spectrometer (Perkin Elmer 2000) on compression moulded thin (0.5-1.0 mm) films at a resolution of 4 $cm^{-1}$ and analysed in absorption mode.

For polyethylenes three types of C=C containing functional groups were quantified, each with a characteristic absorption and each calibrated to a different model compound resulting in individual extinction coefficients:

vinyl (R—CH=CH2) via 910 $cm^{-1}$ based on 1-decene [dec-1-ene] giving E=13.13 $1 \cdot mol^{-1} \cdot mm^{-1}$ vinylidene (RR'C=CH2) via 888 $cm^{-1}$ based on 2-methyl-1-heptene[2-methyhept-1-ene] giving E=18.24 $1 \cdot mol^{-1} \cdot mm^{-1}$ trans-vinylene (R—CH=CH—R') via 965 $cm^{-1}$ based on trans-4-decene[(E)-dec-4-ene] giving E= 15.141 $\cdot mol^{-1} \cdot mm^{-1}$ For polyethylene homopolymers or copolymers linear baseline correction was applied between approximately 980 and 840 $cm^{-1}$.

Rheology

Rheological parameters such as Shear Thinning Index SHI and Viscosity are determined by using a rheometer, preferably a Anton Paar Physica MCR 300 Rheometer on compression moulded samples under nitrogen atmosphere at 190° C. using 25 mm diameter plates and plate and plate geometry with a 1.8 mm gap according to ASTM 1440-95. The oscillatory shear experiments were done within the linear viscosity range of strain at frequencies from 0.05 to 300 rad/s (ISO 6721-10). Five measurement points per decade were made. The method is described in detail in WO 00/22040.

The values of storage modulus (G'), loss modulus (G") complex modulus (G*) and complex viscosity ($\eta^*$) were obtained as a function of frequency ($\omega$). $\eta_{100}$ is used as abbreviation for the complex viscosity at the frequency of 100 rad/s.

Shear thinning index (SHI), which correlates with MWD and is independent of Mw, was calculated according to Heino ("Rheological characterization of polyethylene fractions" Heino, E. L., Lehtinen, A., Tanner J., Seppala, J., Neste Oy, Porvoo, Finland, Theor. Appl. Rheol., Proc. Int. Congr. Rheol, 11th (1992), 1, 360-362, and "The influence of molecular structure on some rheological properties of polyethylene", Heino, E. L., Borealis Polymers Oy, Porvoo, Finland, Annual Transactions of the Nordic Rheology Society, 1995).

SHI value is obtained by calculating the complex viscosities at given values of complex modulus and calculating the ratio of the two viscosities. For example, using the values of complex modulus of 2.7 kPa and 210 kPa, then $\eta^*(2.7$ kPa) and $\eta^*(210$ kPa) are obtained at a constant value of complex modulus of 2.7 kPa and 210 kPa, respectively. The shear thinning index $SHI_{2.7/210}$ is then defined as the ratio of the two viscosities $\eta^*(2.7$ kPa) and $\eta^*(210$ kPa), i.e. $\eta(2.7)/\eta(210)$.

It is not always practical to measure the complex viscosity at a low value of the frequency directly. The value can be extrapolated by conducting the measurements down to the frequency of 0.126 rad/s, drawing the plot of complex viscosity vs. frequency in a logarithmic scale, drawing a best-fitting line through the five points corresponding to the lowest values of frequency and reading the viscosity value from this line.

Torque: The polymers were received as powders and were sieved before use. Only particles smaller than 2.0 mm in diameter are included. Each sample was prepared by adding 99.3 wt % polyethylene and 0.3 wt % antioxidant, Irganox B225 (received from BASF), to a glass bottle. The bottles were shaken and to each sample, 0.4 wt % 2,5-dimethyl-2, 5-di(tert-butylperoxi)hexyn-3 (Trigonox 145 E85, received from Akzo Nobel) was added drop by drop. The total sample weight was 100 g.

Soaking was performed by rotation of samples during 20 h in a Heraeus Instruments rotation oven at room temperature.

After soaking, the polymer powder was compression moulded into circular discs (Ca:3 mm thick. Diameter:40 mm). in a Specac compression moulding machine. This was done at a temperature of 122° C., under a pressure of 5 kPa for 2 minutes, followed by cooling for 2 minutes under the same pressure. The cross-linking was performed in a Monsanto Rheometer (MDR 2000 E), an instrument which measures the torque (Nm or dNm) vs. time by oscillating movements (0.5 degrees with a moving frequency of 50 times per minute in air atmosphere) and it is therefore possible to study at what time the cross-linking starts and to what degree it is achieved. Measurements were performed for 5 minutes at 200° C., on two samples from each material.

Degree of Crosslinking (XL, %) was measured by decaline extraction (ASTM D 2765-01, Method A) on material subjected to the Rheometer testing. The parameter t90 is the time it takes to reach 90% of the final torque value achieved after the complete measuring time, in this case 5 minutes.

Comonomer Content (FTIR)

Comonomer content can be determined in a known manner based on Fourier transform infrared spectroscopy (FTIR) determination calibrated with 13C-NMR.

Catalyst Preparation 1

The catalyst complex 1 used in the polymerisation examples was silica supported bis(n-butylcyclopentadienyl) zirconium dichloride, $(n-BuCp)_2ZrCl_2$.

10.0 kg activated silica (commercial amorphous silica carrier, Sylopol 2056PI, having an average particle size 40 μm, supplier: Grace) was slurried into 21.7 kg dry toluene at room temperature. Then the silica slurry was added to 14.8 kg of 30 wt % methylalumoxane in toluene (MAO, supplied by Albemarle) over 3 hours. Afterwards the MAO/silica mixture was heated to 79° C. for 6 hours and then cooled down to room temperature again.

The resulting solution was reacted with 0.33 kg of $(n-BuCp)_2ZrCl_2$ in toluene for 8 hours at room temperature.

The catalyst was dried under nitrogen purge for 5.5 hours at 50° C.

The obtained catalyst had an Al/Zr mol-ratio of 19.5, an Zr-concentration of 0.13 wt % and an Al-concentration of 7.8 wt %.

Catalyst Preparation 2

The second catalyst complex used in the polymerisation examples was bis(n-butylcyclopentadienyl)hafnium dibenzyl, $(n-BuCp)_2Hf(CH_2Ph)_2$, and it was prepared according to "Catalyst Preparation Example 2" of WO2005/002744, starting from bis(n-butylcyclopentadienyl)hafnium dichloride (supplied by Witco).

The respective activated catalyst was prepared as in WO2010052266. The obtained catalyst had an Al/Hf mol-ratio of 8.7, an Hf-concentration of 0.71 wt % and an Al-concentration of 34.4 wt %.

EXAMPLE 1

Two different SSC PE resins were polymerised in bench scale reactor in isobutane slurry. Each of them utilising different types of SS-catalysts with different Mw capability. Comparing the two resins enables us to see differences in unsaturation level due to the fact that one of them is polymerised with hydrogen and the other without but with similar Mw level. Polymerisation conditions are given in Table 1. Basic resin characteristics are given in Table 2.

TABLE 1

| Run # | 1 | 2 |
|---|---|---|
| Catalyst | Cat 1 | Cat 2 |
| Hydrogen (ppm) | 0 | 650 |
| Temperature (° C.) | 85 | 85 |
| Ethylene pressure (bar) | 21 | 21 |
| polymer (g) | 372 | 387 |
| Productivity (gpol/gcat) | 600 | 2060 |
| Activity (gpol/gcat/hr) | 470 | 1790 |

TABLE 2

| | Resin 1 | Resin 2 |
|---|---|---|
| Catalyst | Zr-type | Hf-type |
| Density, kg/m³ | 945 | 952 |
| MFR2, g/10 min | 1.95 | 1.50 |
| MFR21, g/10 min | 33 | 25 |
| Mw, g/mol | 110,000 | 125,000 |
| Mn, g/mol | 46,000 | 52,000 |
| MWD | 2.4 | 2.4 |
| ETA0.05, Pa · s | 3639 | 4908 |
| ETA300, Pa · s | 1051 | 1141 |
| SHI (1/100) | 1.8 | 1.9 |
| Mw (from rheology), g/mol | 114.900 | 123.300 |
| Trans-vinylene (C═C/1000C) | 0.263 | 0.032 |
| Vinyl (C═C/1000C) | 0.076 | 0.008 |
| Vinylidene (C═C/1000C) | 0.015 | 0.018 |
| Total unsaturations (1/1000C) | 0.354 | 0.058 |
| Carbons per molecule (i.e. Mn/14) | 3286 | 3714 |
| Total C═C per molecule | 1.16 | 0.22 |
| Torque (min. value), dNm | 0.17 | 0.26 |
| Torque (max value), dNm | 7.76 | 6.76 |
| Delta torque (max-min) | 7.59 | 6.50 |
| T90, min/secs. | 3.22 | 3.32 |
| Torque ratio (Max/Min) | 46 | 26 |
| XL degree, % | 60.04 | 53.83 |

It can clearly be seen that Resin 1 crosslinks better than Resin 2. This is believed to be caused by the higher amount of unsaturations formed during the polymerisation without hydrogen. The primary factor is the Torque max which is significantly higher for Resin 1, even if starting torque (dependent on resin viscosity) is taken into account. The delta torque value takes the difference into account. When looking at the Torque ratio, meaning the final torque divided by the initial torque, the example of the invention has an increase in the X-linking efficiency of 77%. Furthermore, the T90 value (time to reach 90% of the final crosslinking value) is more favourable for Resin 1. The difference between the samples 10 seconds which is significant.

EXAMPLE 2

Samples of the two resins were crosslinked in a Monsanto rheometer using different amounts of peroxide 0.25% for Resin 1 and 0.40% for Resin 2. Torque max are the same and degree of crosslink are the same. Hence wt % peroxide can be saved.

It should be apparent that the foregoing relates only to the preferred embodiments of the present application and the resultant patent. Numerous changes and modification may be made herein by one of ordinary skill in the art without departing from the general spirit and scope of the invention as defined by the following claims and the equivalents thereof.

We claim:

1. A single site catalysed ethylene polymer comprising ethylene and optionally at least one comonomer having a Mw/Mn of less than 5, a density of at least 930 kg/m$^3$ and wherein the total amount of unsaturations of the ethylene polymer (per average molecule) is at least 0.8.

2. A polymer as claimed in claim 1 having a density of 940 to 955 kg/m$^3$.

3. A polymer as claimed in claim 1 having an ethylene content of at least 85 wt %.

4. A polymer as claimed in claim 1 having an MFR$_{21}$ of 5 to 50 g/10 min.

5. A polymer as claimed in claim 1 having an Mn value of 25,000 to 75,000.

6. A polymer as claimed in claim 1 having an Mw/Mn of less than 3.

7. A polymer as claimed in claim 1 having carbon-carbon double bonds/1000 carbon atoms in a total amount of at least 0.2/1000 carbon atoms.

8. A polymer as claimed in claim 1 being a homopolymer.

9. A polymer as claimed in claim 1 made using a metallocene catalyst.

10. A polymer as claimed in claim 1 made by a catalyst of formula (I)

$$Cp'_2M'X'_2$$

wherein each X' is halogen, C$_{1-6}$ alkyl, benzyl or hydrogen; M' is Hf or Zr;
Cp' is a substituted or unsubstituted cyclopentadienyl or indenyl group.

11. A composition comprising an ethylene polymer as claimed in claim 1.

12. A process for the preparation of a crosslinked ethylene polymer pipe comprising polymerizing ethylene or ethylene and at least one comonomer in the presence of a single site catalyst to form an ethylene homopolymer or copolymer having a Mw/Mn of less than 5 and wherein the total amount of unsaturations of the ethylene polymer (per average molecule) is at least 0.8 into a pipe by extrusion and crosslinking in the absence of hydrogen.

13. A cross-linked pipe comprising a cross-linked single site catalysed ethylene polymer comprising an ethylene homopolymer or copolymer having a Mw/Mn of less than 5 and wherein the total amount of unsaturations of the ethylene homopolymer or copolymer (per average molecule) is at least 0.8.

14. A pipe as claimed in claim 13 wherein said pipe has a torque max value of at least 7 dNm.

15. A polymer as claimed in claim 10 made by a catalyst of Formula (I) wherein Cp' is substituted by one or more C$_{1-10}$ hydrocarbyl groups.

16. A polymer as claimed in claim 10 made by a catalyst of Formula (I) wherein said Cp' substituents are bridged.

17. A polymer as claimed in claim 10 made by a catalyst of Formula (I) wherein said Cp' substituents are bridged with an ethylene or dimethylsilyl link.

18. A process comprising polymerising ethylene or ethylene and at least one comonomer in the presence of a single site catalyst to prepare a single site catalysed ethylene polymer comprising ethylene and optionally at least one comonomer having a Mw/Mn of less than 5, a density of at least 930 kg/m$^3$ and wherein the total amount of unsaturations of the ethylene polymer (per average molecule) is at least 0.8.

* * * * *